US010860650B1

(12) United States Patent
Juang et al.

(10) Patent No.: US 10,860,650 B1
(45) Date of Patent: Dec. 8, 2020

(54) DETERMINING WHICH VIDEOS ARE NEWSWORTHY EVENTS

(71) Applicant: Google Inc., Mountain View, CA (US)

(72) Inventors: Philo Juang, El Paso, TX (US); Justin Lewis, Marina Del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 762 days.

(21) Appl. No.: 15/254,561

(22) Filed: Sep. 1, 2016

(51) Int. Cl.
*G06F 16/00* (2019.01)
*G06F 16/78* (2019.01)
*G06F 16/9535* (2019.01)
*G06Q 50/00* (2012.01)
*H04L 29/08* (2006.01)

(52) U.S. Cl.
CPC ...... *G06F 16/7867* (2019.01); *G06F 16/9535* (2019.01); *G06Q 50/01* (2013.01); *H04L 67/22* (2013.01)

(58) Field of Classification Search
CPC . G06F 16/7867; G06F 16/9535; G06Q 50/01; H04L 67/22
USPC .......................................................... 707/737
See application file for complete search history.

(56) References Cited

U.S. PATENT DOCUMENTS

| | | | | |
|---|---|---|---|---|
| 8,074,162 B1* | 12/2011 | Cohen | ..................... | G06Q 99/00 715/207 |
| 9,129,027 B1* | 9/2015 | Hamedi | ............... | G06F 16/9535 |
| 2002/0056123 A1* | 5/2002 | Liwerant | ............. | H04M 7/0039 725/87 |
| 2008/0052387 A1* | 2/2008 | Heinz | ................. | H04L 41/5025 709/223 |
| 2008/0275763 A1* | 11/2008 | Tran | ........................ | G06Q 20/10 705/35 |
| 2009/0083260 A1* | 3/2009 | Artom | ................ | G06Q 30/0264 |
| 2009/0326970 A1* | 12/2009 | Estrada | .................. | G06Q 30/02 705/1.1 |
| 2010/0138553 A1* | 6/2010 | Yuan | ....................... | G06Q 30/02 709/230 |
| 2010/0161382 A1* | 6/2010 | Cole | ....................... | G06Q 30/02 705/7.32 |
| 2010/0242060 A1* | 9/2010 | Liu | ......................... | G06Q 30/02 725/9 |
| 2011/0264768 A1* | 10/2011 | Walker | ................... | H04N 21/00 709/218 |
| 2013/0054706 A1* | 2/2013 | Graham | .................. | H04L 51/32 709/206 |
| 2013/0210493 A1* | 8/2013 | Tal | .................... | H04W 52/0261 455/566 |

(Continued)

*Primary Examiner* — Shiow-Jy Fan
(74) *Attorney, Agent, or Firm* — Lowenstein Sandler LLP

(57) ABSTRACT

Implementations disclose determining which videos are newsworthy events. A method includes identifying, based on data extracted from online content, a knowledge base (KB) entity corresponding to the online content, identifying an embedded video in the online content, recording an online content identifier (ID) of the online content and a video ID of the embedded video as an entry for the identified KB entity in a KB reference data store, determining at least one video ID that occurs more than a threshold number of times in the entry for the identified KB entity in the KB reference data store, and identifying a resulting video corresponding to one of the at least one video IDs as a candidate for a notification to one or more users.

24 Claims, 6 Drawing Sheets

(56) References Cited

U.S. PATENT DOCUMENTS

| | | | |
|---|---|---|---|
| 2014/0012925 A1* | 1/2014 | Narayanan | G06Q 10/1095 709/206 |
| 2014/0059139 A1* | 2/2014 | Filev | G06Q 10/10 709/205 |
| 2015/0039685 A1* | 2/2015 | Lewis | G06Q 30/02 709/204 |
| 2015/0278691 A1* | 10/2015 | Xia | G06F 16/951 706/11 |
| 2016/0170991 A1* | 6/2016 | Birchall | H04L 67/20 707/751 |
| 2016/0173631 A1* | 6/2016 | McKay | H04L 67/02 709/203 |

* cited by examiner

DETERMINING WHICH VIDEOS ARE NEWSWORTHY EVENTS

TECHNICAL FIELD

This disclosure relates to the field of content sharing platforms and, in particular, to determining which videos are newsworthy events.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, and otherwise interact with the provided content. The shared content may include content from professional content creators, e.g., movie clips, TV clips, and music videos, as well as content from amateur content creators, e.g., video blogging and short original videos.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes identifying, based on data extracted from online content, a knowledge base (KB) entity corresponding to the online content, identifying an embedded video in the online content, recording an online content identifier (ID) of the online content and a video ID of the embedded video as an entry for the identified KB entity in a KB reference data store, determining at least one video ID that occurs more than a threshold number of times in the entry for the identified KB entity in the KB reference data store, and identifying a resulting video corresponding to one of the at least one video IDs as a candidate for a notification to one or more users.

In one implementation, the KB entity includes a topic in a KB, and the KB includes a system to store unstructured data and structured data detailing the topic among other topics stored in the KB. In addition, identifying the embedded video in the online content may further include identifying a tag for the embedded video in HyperText Markup Language (HTML) code of the online content. In another implementation, the resulting video includes the video ID having the highest number of occurrences in the entry for the identified KB entity, and a language and geographic categorization that satisfies a predetermined language and geographic category for the KB entity.

In some implementations, the resulting video includes content that is not classified as inappropriate content based on a policy of a social network hosting the resulting video. Furthermore, an occurrence of the at least one video ID can be counted when the online content ID corresponding to the at least one video ID in the KB reference data store is associated with a whitelist of online content IDs. In addition, the method may include determining that the KB entity is not listed in an exclusion list.

In further implementations, the method includes identifying a user of the one or more users to send the notification for the resulting video, wherein the user is identified based on an affinity score of the user for the identified KB entity. The affinity score of the user for the identified KB entity may be based on a viewing history and an interaction history of the user for other videos corresponding to the KB entity.

In another implementation, the method includes transmitting the notification to a user device of the user, the notification identifying the resulting video as a newsworthy event. The notification may include a title and a logo that correspond to the identified KB entity. In one implementations, the notification is transmitted to the user device in response to a notification score for the notification exceeding a notification score threshold, where the notification score is based on the affinity score of the user for the identified KB entity and a number of occurrences of the video ID of the resulting video in the entry for the KB entity in the KB reference data store.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The disclosure is illustrated by way of example, and not by way of limitation, in the figures of the accompanying drawings.

DETAILED DESCRIPTION

Figure 1:
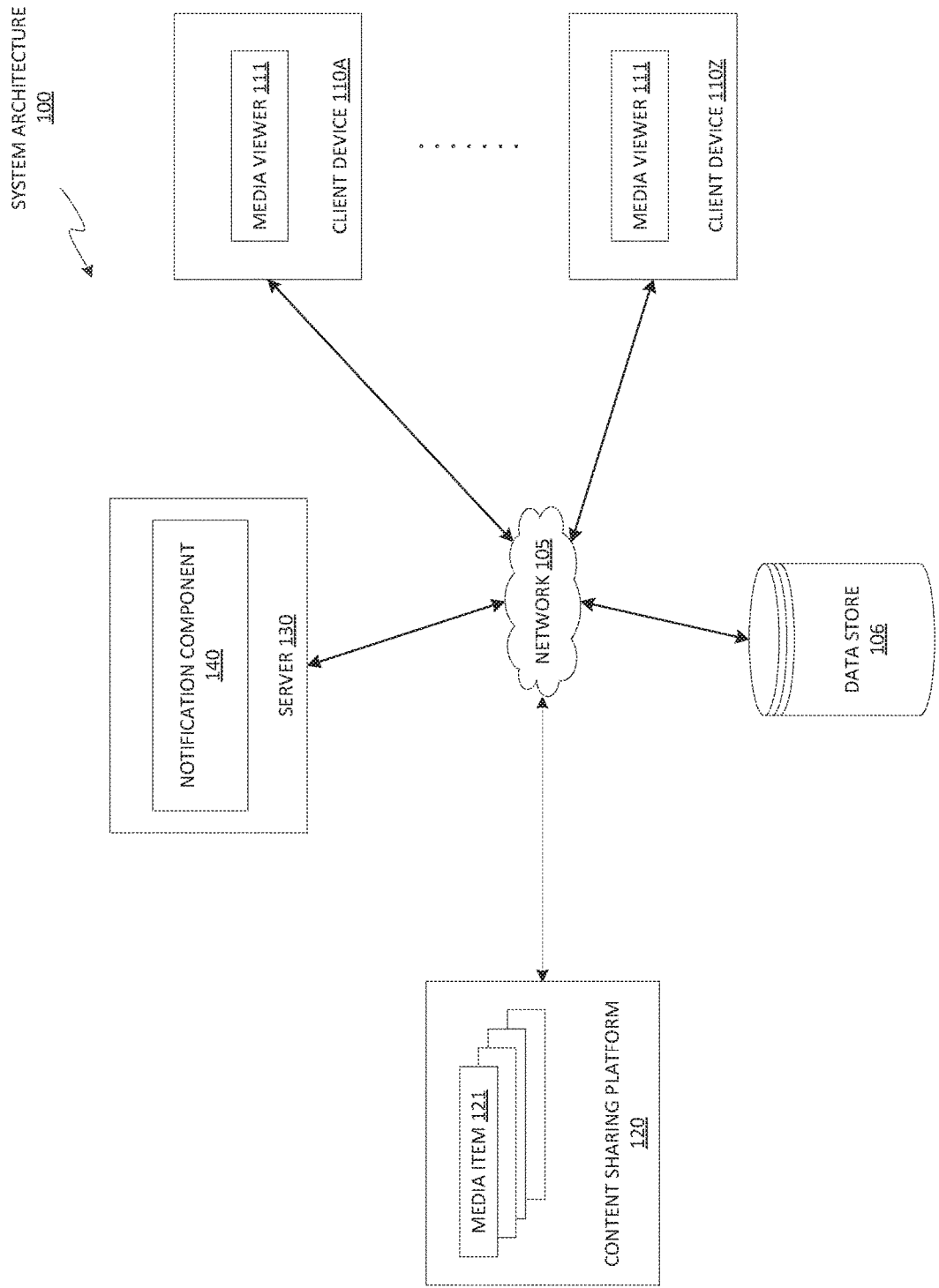
FIG. 1 is a block diagram illustrating an exemplary network architecture in which implementations of the disclosure may be implemented.

Aspects and implementations of the disclosure are described for determining which videos are newsworthy events. In one implementation, "newsworthy" may refer to a video or other media item being of sufficient interest (e.g., topical) to one or more users as to warrant a notification to the one or more users. Notifications are used to encourage user interaction with a mobile application. Notifications can be a cornerstone to user retention for a social network mobile application or service (of a social network), as the notification is an important tool to reach users that are not currently using the social network application. However, overuse of notifications can cause a user to disable the notifications as the user may consider the notifications too intrusive. In many cases, when a user disables notifications, the user may disable all notifications for the mobile application via the operating system of the mobile device. This creates an incentive to make notifications of social network mobile applications and services less intrusive to a user and choose to notify users only for those events that are considered of the "highest quality" and/or "newsworthy."

Newsworthy content for a social network is important as it provides an opportunity to provide notifications to a user of the social network based on a "high quality" event. However, for many social networks, several hundred hours of watch time correlated to media items are uploaded every minute to the social network. This makes it difficult for a social network to determine which media items are truly newsworthy.

Implementations of the disclosure provide a notification component to determine which media items (e.g., videos) can be categorized as newsworthy events. The notification component identifies media items that have been embedded in a variety of online content (e.g., online articles, blogs, etc.), and uses this information as a heuristic to measure how "newsworthy" the embedded media item is.

The notification component uses information extracted from the online content to identify online content documents that are related to each other so that the newsworthy media item can be attributed with a particular entity (e.g., topic) of a knowledge base. A knowledge base refers to a system used to store complex structured and unstructured data that is used to enhance results of a search engine with semantic-search information gathered from a wide variety of sources. The knowledge base provides structured and detailed data about a topic (e.g., knowledge base entity) in addition to a list of links (e.g., hyperlink; reference to data that the reader can directly follow either by selecting, clicking, tapping, and/or hovering) to other online documents. By attributing the newsworthy media item to a particular knowledge base entity, notifications for the media item can then be sent to users who have a high affinity (e.g., co-occurrence relationship among entities; how much of an interaction connection exists between entities, such as a user that watches many videos corresponding to a knowledge base entity, and so on) for that knowledge base entity, thus ensuring that the media item notification is sent to the users who are likely to consider the notification newsworthy, interesting, and/or high-quality.

By using knowledge base entity attribution (e.g., attribution from an online content document embedding a media item to the media item itself) when evaluating the media item, the technology disclosed herein is able to determine overall newsworthiness of the media item more accurately and more efficiently. In addition, by identifying users who have a high affinity for a knowledge base entity corresponding to a newsworthy media item, the technology disclosed herein is further able to tailor notifications to those users who are likely to find these notifications important and to view the media item. As a result, users may receive fewer notifications with a higher relevance to the users, which, in turn, results in less computing resources and computing power utilized to generate these notifications for users.

The disclosure often references videos for simplicity and brevity. However, the teachings of the disclosure are applied to media items generally and can be applied to various types of content or media items, including for example, video, audio, text, images, program instructions, etc.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital videos, digital images, electronic books, etc.). According to aspects of the disclosure, the media viewer 111 may be a content sharing platform application for providing notifications for videos that are determined to be newsworthy events.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may host data content, such as media items 121. The data content can be digital content chosen by a user, digital content made available by a user, digital content uploaded by a user, digital content chosen by a content provider, digital content chosen by a broadcaster, etc. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a notification component 140. The notification component 140 enables the use of non-media item-related online content (e.g., online articles, blogs, etc.) in determining the importance of a topic. The notification component 140 determines the timeliness, as well as importance, of a given media item by examining the volume of online content that is clustered into a same knowledge base entity (i.e. topic). A knowledge base (KB) is a system used to store complex structured and unstructured data that is used to enhance results of a search engine with information gathered from a wide variety of sources. The KB provides structured and detailed data about a topic (i.e., entity of the KB) in addition to a list of links (e.g., hyperlink; reference to data that the reader can directly follow either by selecting, clicking, tapping, or hovering) to other online content.

In some implementations, the notification component 140 leverages a process of "web crawling" (e.g., extracting information from online content hosted on the Internet) to identify media items (e.g., videos) that have been recently embedded in the online content (e.g., online articles, blogs, etc.) that can be provided in the form of web pages or other online documents or files. The notification component 140 can utilize the extracted information from the web crawling process as a heuristic to measure how "newsworthy" the media item is. The notification component 140 can also use the extracted information to associate a KB entity with the online content, and then attribute embedded media items of the online content to the particular KB entity. By attributing the newsworthy media item to a particular KB entity, notifications for the media item can then be sent to users who have a high affinity for that KB entity, thus directing the media item notification to those users who are likely to consider the notification worthy. The KB entity may also be used to design the media item notification, which is helpful in cases when the media item thumbnail is not descriptive. For example, a logo, title information, and/or summary text corresponding to the knowledge base entity may be used for the design of the notification.

In some implementations, notification component 140 of server 130 may interact with content sharing platform 120 to provide implementations of the disclosure. Further description of the notification component 140, as well as its specific functions, is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
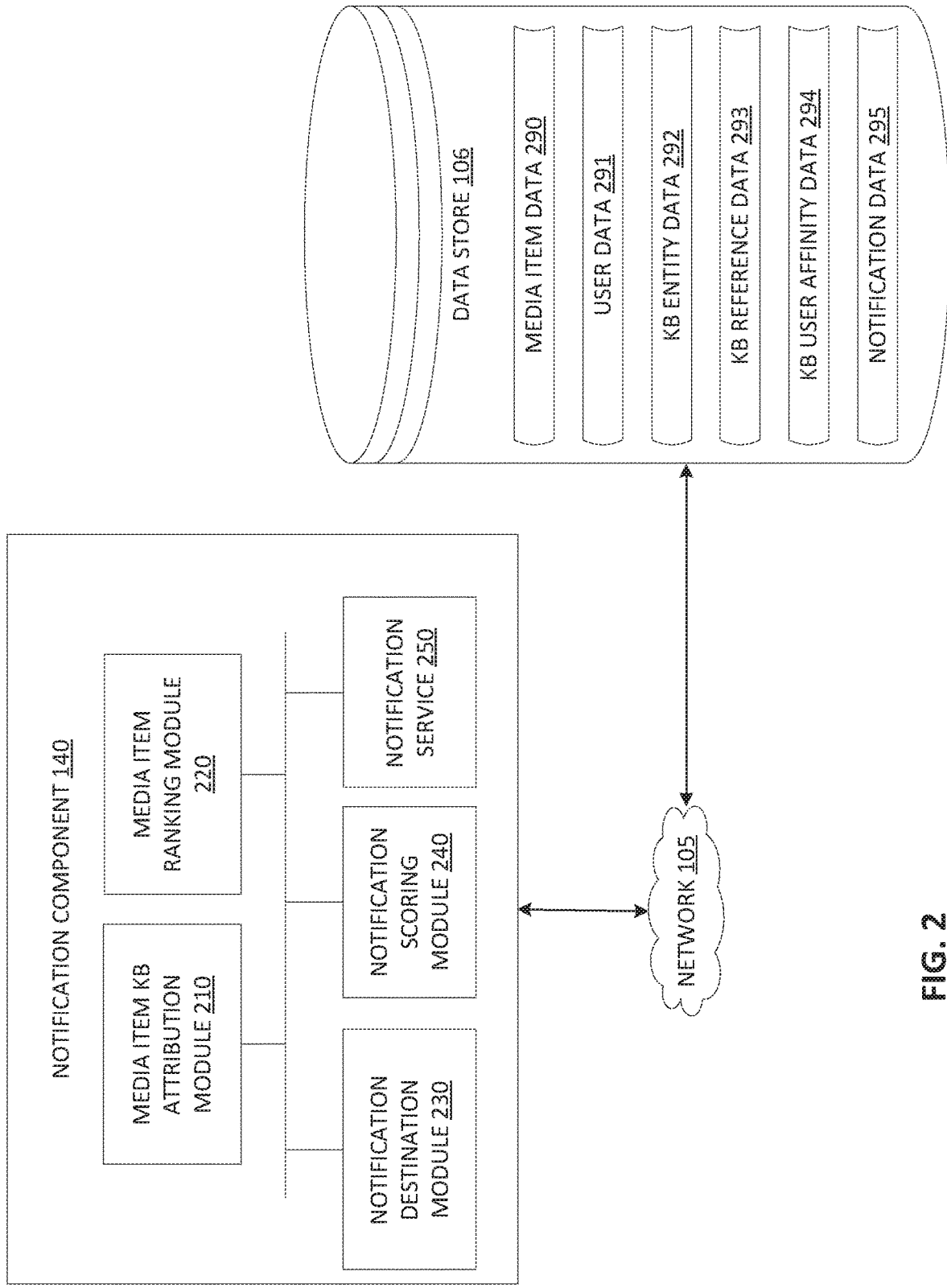
FIG. 2 is a block diagram of a notification component, in accordance with an implementation of the disclosure.

FIG. 2 is a block diagram illustrating notification component 140 in accordance with one implementation of the disclosure. As discussed above, the notification component 140 may interact with a single social network, or may be utilized among multiple social networks (e.g., provided as a service of a content sharing platform that is utilized by other third party social networks). In one implementation, the notification component 140 includes a media item KB attribution module 210, a media item ranking module 220, a notification destination module 230, a notification scoring module 240, and a notification service 250. More or less components may be included in the notification component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The notification component 140 is communicatively coupled to the data store 106. For example, the notification component 140 may be coupled to the data store 106 via a network (e.g., via network 105 as illustrated in FIG. 1). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes media item data 290, user data 291, KB entity data 292, KB reference data 293, KB user affinity data 294, and notification data 295.

As discussed above, the notification component 140 enables the use of non-media item-related online content (e.g., web pages) in determining the importance of a topic. The media item KB attribution module 210 coordinates with a web crawler process. The web crawler process systematically browses the Web (World Wide Web; information space where documents and other resources are identified by Uniform Resource Locators (URLs) that can be accessed via the Internet)), or portions of the Web, to gather and organize information regarding the browsed ("crawled") information space. The media item KB attribution module 210 integrates with the web crawler process in order to identify, for each crawled item of online content, the KB entities associated with the online content and any embedded media items within the online content.

KB entities associated with online content may be determined using a variety of techniques including, but not limited to, frequency of word occurrence in the online content, and so on. Information regarding KB entities may be stored in the KB (e.g., KB entity date 292 in data store 106). When online content is determined to be associated with a KB entity, the online content is referenced as an entry for the particular KB entity in KB reference data 293 of data store 106.

Embedded media items within the online content may be identified by inspecting the HyperText Markup Language (HTML) code of the online content and identifying embedded tags (e.g., metadata including non-hierarchical keywords or terms assigned to a piece of information) for the media item. When the media item KB attribution module 210 identifies embedded media items within a crawled item of online content, the media item KB attribution module 210 may record an identifier (ID) of the media item (e.g., found in media item data 290 of data store 106) as an entry for the KB entity in KB reference data 293 of data store 106. As such, a media item may be correlated with a KB entity based on the media item being embedded in online content that is correlated with the KB entity (e.g., media item takes on KB entity characteristics of its embedding online content). In one implementation, each media item ID referenced in KB reference data 293 for a KB entity may be associated with the corresponding online content in which the media item was embedded.

The media item ranking module 220 may separately access and analyze KB reference data 293 in order to rank media items for newsworthiness purposes. At periodic intervals, the media item ranking module 220 may identify, for each KB entity in KB reference data 293, media item IDs that occur more than a threshold number of times for the KB entity. In other words, the media item ranking module 220 determines all media items that have been embedded by a minimum number of items of online content corresponding to a KB entity. In some implementations, KB entities that are included in an exclusion list (i.e., blacklist) of KB entities are excluded from consideration by the media item ranking module 220.

In some implementations, an occurrence of the media item ID is counted towards the threshold number of occurrences as long as its corresponding embedding online content is identified as whitelisted online content. If online content corresponding to an embedded media item is not located on a whitelist (e.g., list of allowed online content maintained by the social network), then the occurrence of the embedded media item ID for the KB entity in the KB reference data 293 does not count towards a media item ID occurrence at the media item ranking module 220. Once media items corresponding to media item IDs that occur more than a threshold number of times for a KB entity are identified, the media item ranking module 220 may rank the resulting media items according to the number of occurrences of each media item ID, with the highest occurring media items being ranked first.

In some implementations, the media item ranking module 220 may apply language and/or geographic qualifications to the ranked media items. The media item ranking module 220 may determine a language and/or geographic area that correlates to the KB entity (e.g., found in KB entity data 292). The media item ranking module 220 may then filter out the ranked media items to remove those media items that do not match the determined language and/or geographic area of the KB entity. In some implementations, the language and/or geographic area categorization of a media item may be identified using metadata associated with the media item in media item data 290. In other implementations, language and/or geographic area categorization may be determined from viewing history of the media item, language spoken in the media item, and so on.

In further implementations, the ranked media items may also be filtered based on content of the media item. For example, if particular content or language of the media item is considered inappropriate (e.g., violent, explicit, etc.) based on an predetermined policy of the social network hosting the notification component 140, then the media item may be removed from consideration as a newsworthy event by the media item ranking module 220.

As a result of the ranking and the filtering applied by the media ranking module 220, one or more resulting media items may be identified for a particular KB entity as "newsworthy" media items that are relevant to a particular language and/or geographic area. These one or more resulting media items may then be provided, along with the corresponding KB entity (for which the resulting media items are determined to be newsworthy), to notification destination module 230. The notification destination module 230 uses this data in order to identify users that may be notified regarding the newsworthy media item(s).

Notification destination module 230 may utilize KB user affinity data 294 in order to identify users to receive a notification regarding the identified newsworthy media item(s). The KB user affinity data 294 may be a data store that is indexed by KB entities. For each KB entity entry in KB user affinity data 294, a set of users and their corresponding affinity scores with the KB entity are listed. To determine a user's affinity score with a KB entity, a separate process may identify media items viewed by the user (e.g., identified in user data 291 of data store 106) and the user's interaction history with the media items. For each media item viewed by a user, one or more KB entities associated with the media items are determined. A KB entity for a viewed media item may be determined based on metadata associated with the viewed media item, subtitle and description of the viewed media item, comments corresponding to the viewed media item, and so on. Based on the user's viewing history and interactions (e.g., liked, frequency of views, etc.) with the viewed media item, an affinity score between the user and the KB entities (that are determined to correspond to the viewed media item) can be calculated and stored as KB user affinity data 294.

When the notification destination module 230 receives an identified newsworthy media item (e.g., a video ID of a video identified as newsworthy by the media item ranking module 220) and its corresponding KB entity, the notification destination module 230 may reference KB user affinity data 294 with the corresponding KB entity for the newsworthy media item and identify one or more users having a high affinity score for the KB entity. In one implementation, a "high" affinity score may be any score that exceeds a predetermined affinity score threshold. In another implementation, all users having an affinity score associated with a KB entity may be identified. The identified users are considered as potential recipients of a notification regarding the identified newsworthy media item.

For each user identified by notification destination module 230 as potential recipient of a newsworthy media item, the notification scoring module 240 generates a notification score that roughly translates into an importance factor for the notification. The notification score may be based on the user's affinity score for the KB entity and the number of times the media item was embedded in online content corresponding to the KB entity. For example, if a user has a high affinity score for the KB entity and the media item was embedded in many different items of online content corresponding to the KB entity, then the notification score for the user to receive a notification of the media item is also a high notification score. In one implementation, the notification score is stored as notification data 295 in data store 106.

The notification scoring module 240 then passes an internal notification payload to the notification service 250. The internal notification payload may include a user ID of the user to receive a notification, a media item ID of the newsworthy media item that is the subject of the notification, the notification score for the user/media item combination, and notification description data for the notification (e.g., title, picture, and/or summary text). The title, picture, and/or summary text of the notification may be propagated from a general title, logo, and/or description corresponding to the KB entity that the newsworthy media item was generated for. In one implementation, this information may be found in KB entity data 292 of data store 106. Providing the general KB entity descriptive information (title, logo, summary text) may help address situations where a media item does not include sufficient descriptive material and/or metadata to identify a subject or topic for the notification.

In one implementation, the notification service 250 determines whether a user should receive a notification regarding the newsworthy media item. The notification service 250 considers many different input factors in determining whether a user is to receive a notification, one of which is the notification score described above. Other input factors are also considered by the notification service 250 including, but not limited to, the last time a user received a notification, how many notifications a user has received in an immediate past time interval, the responsiveness of a user to provided notifications, and so on. The input factors considered for sending a notification to a user may be dependent on one another. For example, if a user has received many notifications over the past 24 hours, then a notification score threshold that the notification score should exceed may be higher than the notification score threshold if the user had received few to no notifications in the past 24 hours.

If the notification service 250 determines to send a notification to the user, then an external notification payload is generated and transmitted to the user device by the notification service 250. The external notification payload includes the media item ID, the notification description data (used to design the notification), and a priority of the notification. The priority of the notification directs the placement (e.g., top of list, bottom of list, etc.) of the notification when provided on the user device. The external notification payload, including the priority of the notification, may be stored as notification data 295 in data store 106.

Figure 3:
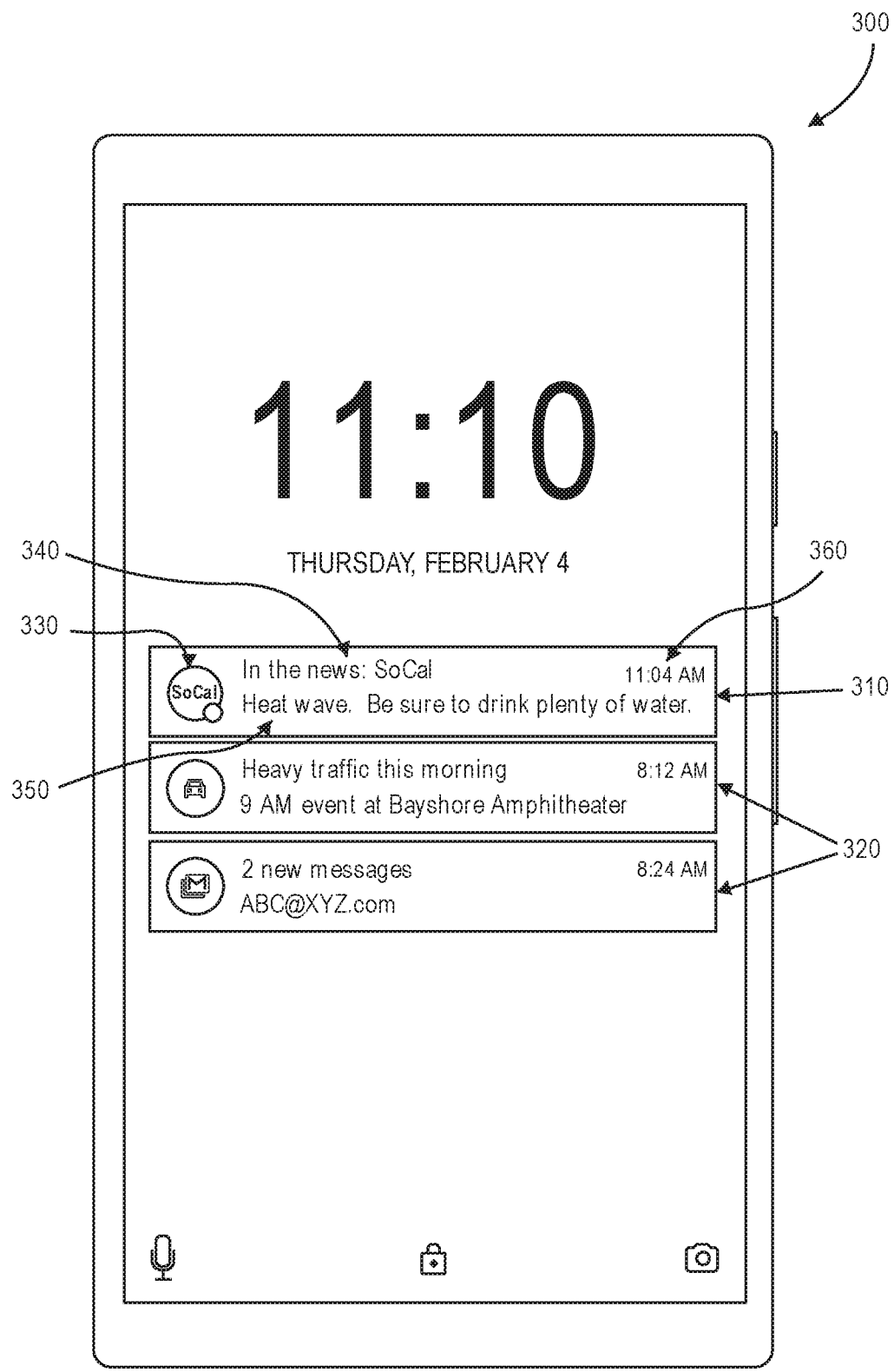
FIG. 3 is an example of a user interface for a newsworthy event notification according to an implementation of the disclosure.

FIG. 3 is an example screenshot of a graphical user interface (GUI) 300 providing a notification for a determined newsworthy media item according to an implementation of the disclosure. GUI 300 includes multiple notifications 310, 320. Notification 310 is a notification for a newsworthy media item identified as discussed above with respect to FIG. 2. Notifications 320 may be other notifications for different events, such as a traffic notification and a new email notification.

Notification 310 may include a logo 330, title 340, and summary text 350. In addition, a time 360 that the notification is presented on the user device may be included in notification 310. As discussed above, the logo 330, title 340, and summary text 350 may be based on notification description data of the KB entity from which the media item is considered newsworthy. As discussed above, the placement of the notification 320 with respect to other notifications 320 may be determined based on the priority of the notification. As illustrated in GUI 300, the priority of the notification caused the notification 310 to be displayed above the other notifications 320. The priority of the notification may be provided by the notification service (e.g., notification service 250 of FIG. 2) to the user device.

Figure 4:
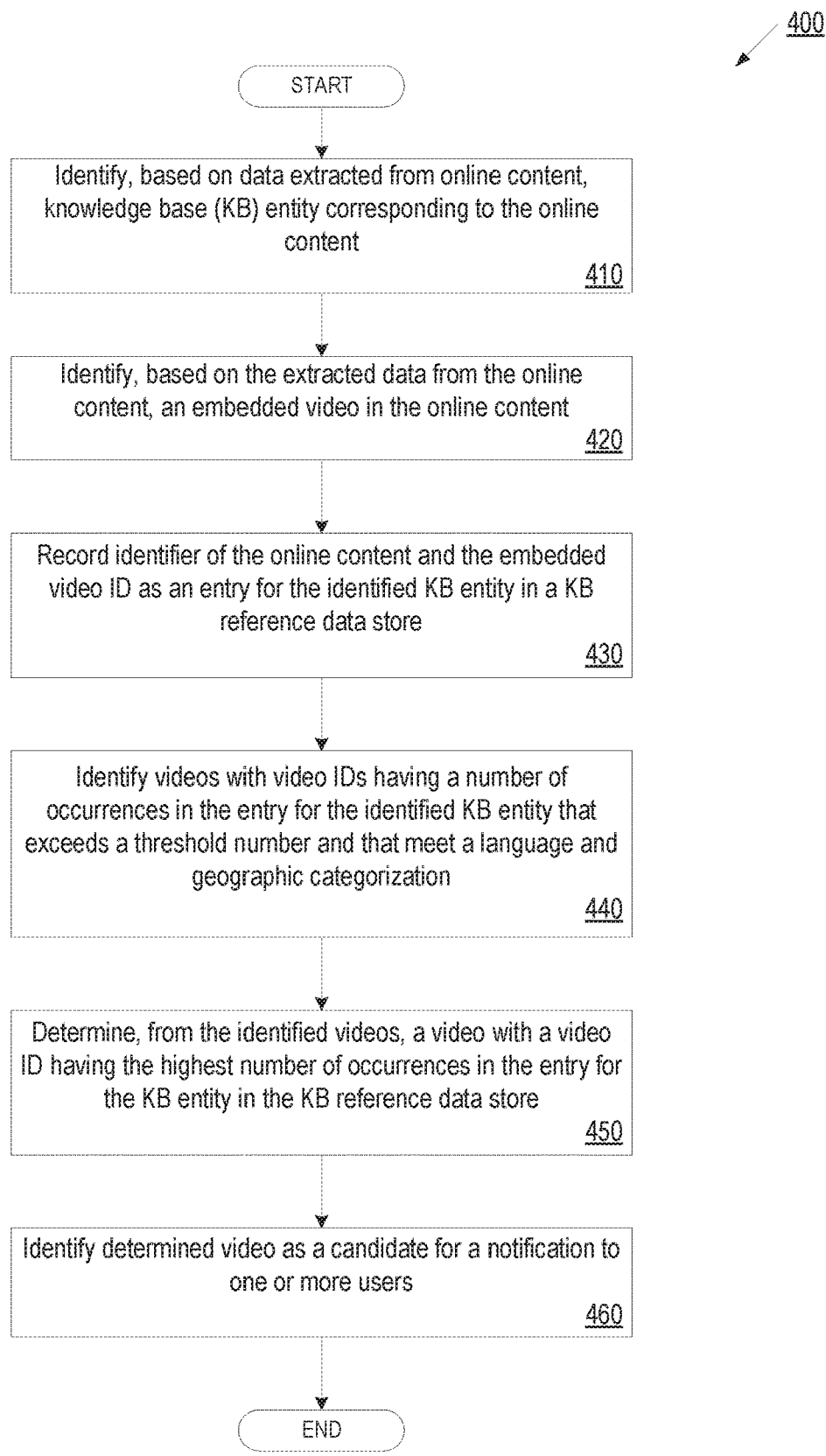
FIG. 4 is a flow diagram illustrating a method for determining which videos are newsworthy events according to an implementation.

FIG. 4 is a flow diagram illustrating a method 400 for determining which videos are newsworthy events according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art should understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by notification component 140 as shown in FIG. 2.

Method 400 begins at block 410 where a KB entity corresponding to online content (e.g., a web page) is identified based on information extracted from the online content. In one implementation, the information is extracted by a web crawler process. At block 420, an embedded video in the online content is identified based on the extracted information from the online content. In one implementation, an embedded video within online content, such as a web page, may be identified by inspecting HTML code of the online content and identifying embedded tags for the video.

Subsequently, at block 430, an ID of the online content and an ID of the embedded video are recorded as entries (i.e., related entries) for the identified KB entity in a KB reference data store. At block 440, video IDs in the entry for the KB entity in the KB reference data store that occur more than a threshold number of times are identified. In addition, in some implementations, the videos corresponding to the identified video IDs should meet a language and/or geographic categorization. In further implementations, an occurrence of the video ID in the entry is counted when it is associated with (e.g., embedded by) a whitelisted item of online content. In additional implementations, the video may be excluded from consideration at block 440 if it is identified as having inappropriate content (e.g., explicit content, violent content, etc.) according to a predetermined policy of the social network.

At block 450, a video of the identified videos having the highest number of video ID occurrences in the entry for the KB entity in the KB reference data store is determined. Lastly, at block 460, the determined video is identified as a candidate for a notification to one or more users. In one implementation, the determined video is considered a newsworthy event. In some implementations, if a KB entity in the KB reference data store is included in an exclusion list (e.g., blacklist) of KB entities, then the KB entity is not processed by blocks 440-460 of method 400.

Figure 5:
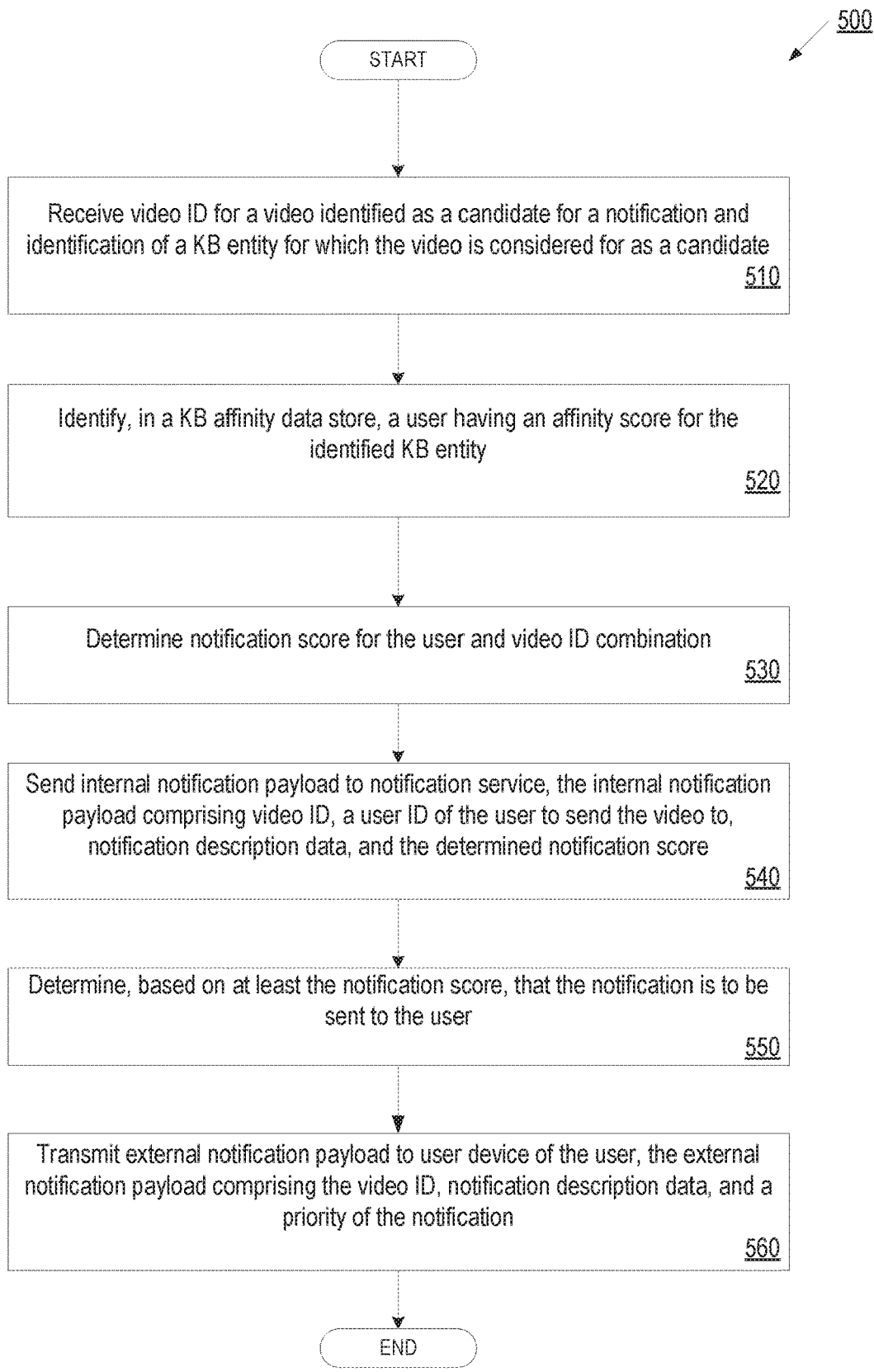
FIG. 5 is a flow diagram illustrating another method for determining which videos are newsworthy events, according to an implementation.

FIG. 5 is a flow diagram illustrating a method 500 for generating a notification for a video determined as a newsworthy event, according to an implementation of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by notification component 140 as shown in FIG. 2.

Method 500 begins at block 510 where a video ID for a video identified as a candidate for a notification is received. In one implementation, method 400 of FIG. 4 is used to identify the video as the candidate for notification (e.g., a newsworthy event). At block 520, a KB user affinity data store is accessed to identify a user having an affinity score for the identified KB entity. In one implementation, the user is identified when he or she has an affinity score that exceeds an affinity score threshold for newsworthy notifications. The affinity scores for the identified KB entity may be generated based on user viewing history and interactions with videos identified as corresponding to the KB entity. In one implementation, more than one user may be identified at block 520. For ease of description, method 500 describes generating a notification for a single user. However, method 500 may be extended to apply to multiple users identified at block 520.

At block 530, a notification score for the user and video ID combination is determined. The notification score may be based on the user's affinity score for the KB entity and a number of occurrences of the video ID for the KB entity in a KB reference data store. At block 540, an internal notification payload is sent to a notification service of the social network. In one implementation, the internal notification payload may include the video ID, a user ID of the user, notification description data, and the determined notification score for the user. The notification description data may include a title, logo, and/or summary text for the identified KB entity that is used to design the notification.

At block 550, the notification service determines that the notification is to be sent to the user. In one implementation, the determination to send the notification to the user is based, at least in part, on the notification score for the user determined at block 530. Other factors may also be considered when determining whether to send a notification to the user, including, but not limited to, number and frequency of previous notifications sent to the user. Lastly, at block 560, an external notification payload is sent to a user device of the user. In one implementation, the external notification payload includes the video ID, the notification description data, and a priority of the notification. The priority of the notification may be determined by the notification service and may direct placement of the notification on the user device.

Figure 6:
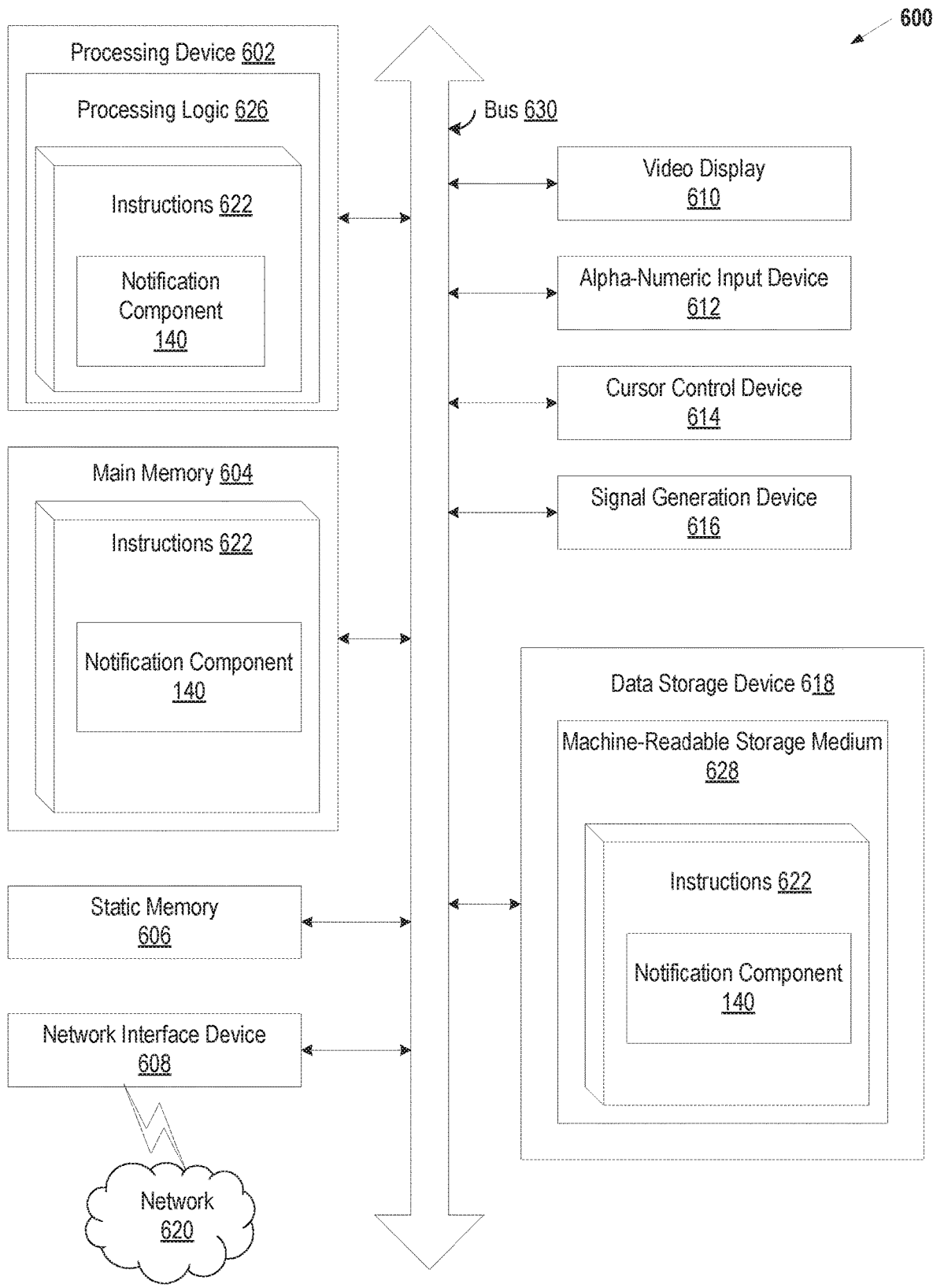
FIG. 6 is a block diagram illustrating one implementation of a computer system, according to an implementation.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a server, such as server 102, executing a notification component 140, as described with respect to FIGS. 1 and 2.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 (also referred to as a machine-readable storage medium), on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The computer-readable storage medium 628 may also be used to store instructions to perform a method for determining which videos are newsworthy events and generating notifications for videos that are determined to be newsworthy events, as described herein. While the computer-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the disclosure. It should be apparent to one skilled in the art, however, that at least some implementations of the disclosure may be practiced without these specific details. In other instances, well-known components or methods are not described in detail or are presented in simple block diagram format in order to avoid unnecessarily obscuring the disclosure. Thus, the specific details set forth are merely exemplary. Particular implementations may vary from these exemplary details and still be contemplated to be within the scope of the disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
    identifying, by a processing device based on data extracted from online content, a knowledge base (KB) entity corresponding to the online content, wherein the KB entity is one of a plurality of entries in a knowledge base data store, the plurality of entries in the knowledge base data store being based on structured data and unstructured data about a plurality of topics in the knowledge base data store;
    identifying an embedded video in the online content;
    recording an online content identifier (ID) of the online content and a video ID of the embedded video as an entry for the identified KB entity in a KB reference data store that is separate from the knowledge base data store;
    determining, by the processing device, at least one video ID that occurs more than a threshold number of times in the entry for the identified KB entity in the KB reference data store;
    identifying, by the processing device, a resulting video corresponding to one of the at least one video ID as a candidate for a notification to one or more users, wherein the resulting video is identified based on content of the resulting video; and
    identifying a user of the one or more users to send the notification for the resulting video, wherein the user is identified based on an affinity score of the user for the identified KB entity.

2. The method of claim 1, wherein the KB entity comprises a topic in the knowledge base data store.

3. The method of claim 1, wherein identifying the embedded video in the online content further comprises identifying a tag for the embedded video in HyperText Markup Language (HTML) code of the online content.

4. The method of claim 1, wherein the resulting video comprises:
    the video ID having the highest number of occurrences in the entry for the identified KB entity; and
    a language and geographic categorization that satisfies a predetermined language and geographic category for the KB entity.

5. The method of claim 1, wherein the resulting video comprises content that is not classified as inappropriate content based on a policy of a social network hosting the resulting video.

6. The method of claim 1, wherein an occurrence of the at least one video ID is counted when the online content ID corresponding to the at least one video ID in the KB reference data store is associated with a whitelist of online content IDs.

7. The method of claim 1, further comprising determining that the KB entity is not listed in an exclusion list.

8. The method of claim 1, wherein the affinity score of the user for the identified KB entity is based on a viewing history and an interaction history of the user for other videos corresponding to the KB entity.

9. The method of claim 1, further comprising transmitting the notification to a user device of the user, the notification identifying the resulting video as a newsworthy event.

10. The method of claim 9, wherein the notification comprises a title and a logo that correspond to the identified KB entity.

11. The method of claim 9, wherein the notification is transmitted to the user device in response to a notification score for the notification exceeding a notification score threshold, wherein the notification score is based on the affinity score of the user for the identified KB entity and a number of occurrences of the video ID of the resulting video in the entry for the KB entity in the KB reference data store.

12. A system comprising:
a memory; and
a processing device coupled to the memory, wherein the processing device is to:
receive a video identifier (ID) for a video identified as a candidate for a notification, wherein the video is identified based on content of the video;
receive identification of a knowledge base (KB) entity for which the video is considered as the candidate, wherein the KB entity is one of a plurality of entries in a knowledge base data store, the plurality of entries the knowledge base data store being based on structured data and unstructured data about a plurality of topics in the knowledge base data store, and wherein the KB entity has a corresponding entry in a KB reference data store that is separate from the knowledge base data store, the corresponding entry comprising the video ID;
identify a user of one or more users to send a notification, the user identified based on an affinity score for the identified KB entity;
determine a notification score for a combination of the user and video ID;
determine, based on at least the notification score, that the notification is to be sent to the user; and
transmit the notification to a user device of the user, the notification comprising the video ID, notification description data, and a priority of the notification.

13. The system of claim 12, wherein the processing device is further to send an internal notification payload to a notification service, the internal notification payload comprising the video ID, a user ID of the user, the notification description data, and the determined notification score.

14. The system of claim 12, wherein the notification description data comprises a title of the notification, a logo for the notification, and summary text for the notification, wherein the title, the logo and the summary text correspond to the identified KB entity.

15. The system of claim 12, wherein the affinity score of the user for the identified KB entity is based on a viewing history and an interaction history of the user for other videos corresponding to the KB entity.

16. The system of claim 12, wherein the notification score is based on the affinity score of the user for the identified KB entity and a number of occurrences of the video ID in the corresponding entry for the KB entity in the KB reference data store.

17. The system of claim 12, wherein the video is identified as the candidate for the notification based on a number of occurrences of the video ID in an entry for the KB entity in a KB reference data store, wherein the video ID occurs in the entry for the KB entity when the video is embedded in online content associated with the KB entity.

18. The system of claim 12, wherein the priority of the notification directs a placement of the notification on the user device.

19. A non-transitory machine-readable storage medium storing instructions which, when executed, cause a processing device to perform operations comprising:
identifying, by a processing device based on data extracted from online content, a knowledge base (KB) entity corresponding to the online content, wherein the KB entity is one of a plurality of entries in a knowledge base data store, the plurality of entries the knowledge base data store being based on structured data and unstructured data about a plurality of topics in the knowledge base data store;
identifying an embedded video in the online content;
recording an online content identifier (ID) of the online content and a video ID of the embedded video as an entry for the identified KB entity in a KB reference data store that is separate from the knowledge base data store;
determining, by the processing device, at least one video ID that occurs more than a threshold number of times in the entry for the identified KB entity in the KB reference data store;
identifying a resulting video corresponding to one of the at least one video IDs as a newsworthy event, wherein the resulting video is identified based on content of the resulting video;
identifying, by the processing device, a user of one or more users to send a notification for the resulting video, wherein the user is identified based on an affinity score of the user for the identified KB entity; and
transmitting a notification to a user device of the user, the notification identifying the resulting video as the newsworthy event.

20. The non-transitory machine-readable storage medium of claim 19, wherein the KB entity comprises a topic in the knowledge base data store.

21. The non-transitory machine-readable storage medium of claim 19, wherein the resulting video comprises:
the video ID having the highest number of occurrences in the entry for the identified KB entity; and
a language and geographic categorization that satisfies a predetermined language and geographic category for the KB entity.

22. The non-transitory machine-readable storage medium of claim 19, wherein an occurrence of the at least one video ID is counted when the online content ID corresponding to the at least one video ID in the KB reference data store is associated with a whitelist of online content IDs.

23. The non-transitory machine-readable storage medium of claim 19, wherein the affinity score of the user for the identified KB entity is based on a viewing history and an interaction history of the user for other videos corresponding to the KB entity.

24. The non-transitory machine-readable storage medium of claim 19, wherein the notification is transmitted to the user device in response to a notification score for the notification exceeding a notification score threshold, wherein the notification score is based on the affinity score of the user for the identified KB entity and a number of occurrences of the video ID of the resulting video in the entry for the KB entity in the KB reference data store.

* * * * *